(12) United States Patent
Cao et al.

(10) Patent No.: US 8,090,512 B2
(45) Date of Patent: Jan. 3, 2012

(54) SYSTEM AND METHOD FOR CONTROLLING A CLUTCH FILL EVENT

(75) Inventors: Ming Cao, Rochester Hills, MI (US); Chi-Kuan Kao, Troy, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 741 days.

(21) Appl. No.: 12/178,696

(22) Filed: Jul. 24, 2008

(65) Prior Publication Data

US 2010/0018833 A1 Jan. 28, 2010

(51) Int. Cl.
*G06F 7/00* (2006.01)
(52) U.S. Cl. ............ 701/68; 701/1; 701/67; 192/85.63; 192/109 F
(58) Field of Classification Search .................... None
See application file for complete search history.

(56) References Cited

U.S. PATENT DOCUMENTS

| | | | | |
|---|---|---|---|---|
| 5,119,695 A | * | 6/1992 | Milunas et al. .................. 477/98 |
| 5,304,102 A | * | 4/1994 | Narita et al. ................... 475/125 |
| 5,580,332 A | * | 12/1996 | Mitchell et al. ............... 477/143 |
| 5,745,382 A | * | 4/1998 | Vilim et al. ..................... 706/16 |
| 6,285,942 B1 | * | 9/2001 | Steinmetz et al. .............. 701/67 |
| 6,292,732 B1 | * | 9/2001 | Steinmetz et al. .............. 701/67 |
| 7,497,799 B2 | * | 3/2009 | Hagelskamp et al. ......... 475/128 |
| 7,643,925 B2 | * | 1/2010 | Whitton .......................... 701/67 |
| 7,909,733 B2 | * | 3/2011 | Imediegwu .................... 477/143 |
| 2005/0216159 A1 | * | 9/2005 | Whittton .......................... 701/67 |
| 2008/0217134 A1 | * | 9/2008 | Popp et al. ..................... 192/85 R |
| 2009/0159389 A1 | * | 6/2009 | Imediegwu .................... 192/3.58 |
| 2010/0018833 A1 | * | 1/2010 | Cao et al. ..................... 192/85 R |

* cited by examiner

*Primary Examiner* — Khoi Tran
*Assistant Examiner* — Jonathan L Sample
(74) *Attorney, Agent, or Firm* — Quinn Law Group, PLLC

(57) ABSTRACT

A method optimizes a fill event of an apply chamber of a fluid-actuated clutch, and includes determining input values describing the fill event, and then estimating a fill time using the input values. The method includes filling the apply chamber using the estimated fill time (EFT) or within an allowable range of the EFT. The input values can include a command line pressure, command fill stroke pressure, and an estimated viscosity of the fluid, although other values can be used. The input values are processed through a neural network having an input layer, an optional hidden layer, and an output layer. An assembly includes a fluid-actuated clutch having an apply chamber and a controller operable for estimating the fill time required for filling the apply chamber, and for controlling the fill of the apply chamber within the EFT.

14 Claims, 3 Drawing Sheets

SYSTEM AND METHOD FOR CONTROLLING A CLUTCH FILL EVENT

TECHNICAL FIELD

The present invention relates to a system and a method for optimizing the control of a process of filling an apply chamber of a fluid-actuated clutch assembly with fluid prior to an engagement or application of the clutch assembly, i.e., a clutch fill event, by modeling or estimating a required clutch fill time.

BACKGROUND OF THE INVENTION

Fluid-actuated torque transfer mechanisms or clutches are hydraulically-actuated devices that selectively connect a pair of rotating shafts, such as an input shaft and an output shaft of an automotive transmission. An application or engagement of one or more clutches connects the two shafts so that torque from the input shaft, which can be connectable to and driven by an internal combustion engine, a battery, or another suitable energy source, is smoothly transferred to the output shaft. In order to shift gears within the transmission, an off-going clutch is disengaged while an on-coming clutch is engaged. Fluid clutches generally provide a relatively rapid response time, as well as a smooth and efficient operation.

In order to engage a fluid clutch, an apply piston is moved in a particular manner using a controlled supply of pressurized fluid. The fluid enters an apply chamber, which is separated from a return or balance chamber by the apply piston. In order to effectively transfer torque across the fluid clutch, the apply chamber must first be filled with pressurized fluid prior to clutch engagement, a process commonly referred to as a clutch fill event. Various methods and devices exist for determining when an apply chamber is sufficiently filled with hydraulic fluid. For example, one or more transducers or pressure sensors can measure a fluid pressure within the apply chamber, and a pressure switch detect clutch fill and therefore control a valve or other fluid control mechanism which supplied the fluid to the apply chamber. However, precise measurement of a dynamically changing fluid pressure and/or remaining volume of an apply chamber can be less optimal, due in part to the potential of direct measurement devices or sensors to introduce feedback error over time and cost-related issues.

SUMMARY OF THE INVENTION

Accordingly, a modeling or an estimating method and a system are provided for optimizing a fill event of a fluid-actuated clutch by estimating an amount of time, i.e., a "fill time", required for completing the fill event, and for subsequently filling an apply chamber of the clutch using the modeled or estimated fill time. The fill time is modeled or estimated by processing various input parameters or values through a neural network, as described hereinbelow.

The method optimizes the fill event by determining a plurality of input values describing the fill event, which in one embodiment includes a command line pressure and a command fill stroke pressure of the clutch, as well as an estimated viscosity of the fluid used for actuating the clutch. The method further includes processing the input through the neural network, and then using the neural network for modeling a fill time required for filling the apply chamber with fluid. The apply chamber is then filled with the fluid within the estimated fill time.

A clutch fill system includes a fluid-actuated clutch having a piston disposed within an apply chamber, and a controller adapted for estimating a clutch fill time based on a plurality of input values describing a fill event of the fluid-actuated clutch. The controller includes a neural network for modeling or estimating the fill time that is required for filling the apply chamber, and is operable for controlling the filling of the apply chamber within the estimated fill time.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
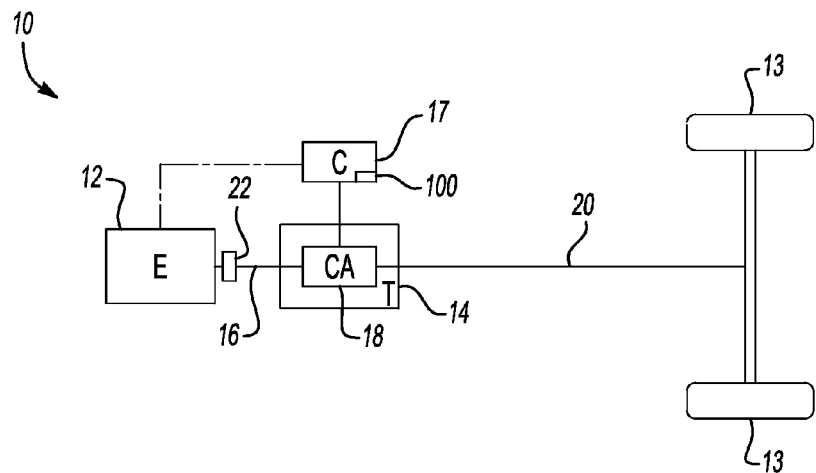
FIG. 1 is a schematic illustration of a vehicle having a fluid-actuated clutch in accordance with the invention.

Referring to the drawings wherein like reference numbers represent like components throughout the several figures, and beginning with FIG. 1, a vehicle 10 includes an engine (E) 12 and an automatic transmission (T) 14. The transmission 14 has an input member 16 which is connectable to the engine 12, and an output member 20 which is drivingly connected to a set of road wheels 13 for propelling the vehicle 10, and one or more fluid-actuated clutch assemblies or clutches (CA), with the clutch 18 being representative thereof. The engine 12 is automatically connectable to the transmission 14 using a torque converter 22 of the type known in the art.

Figure 2:
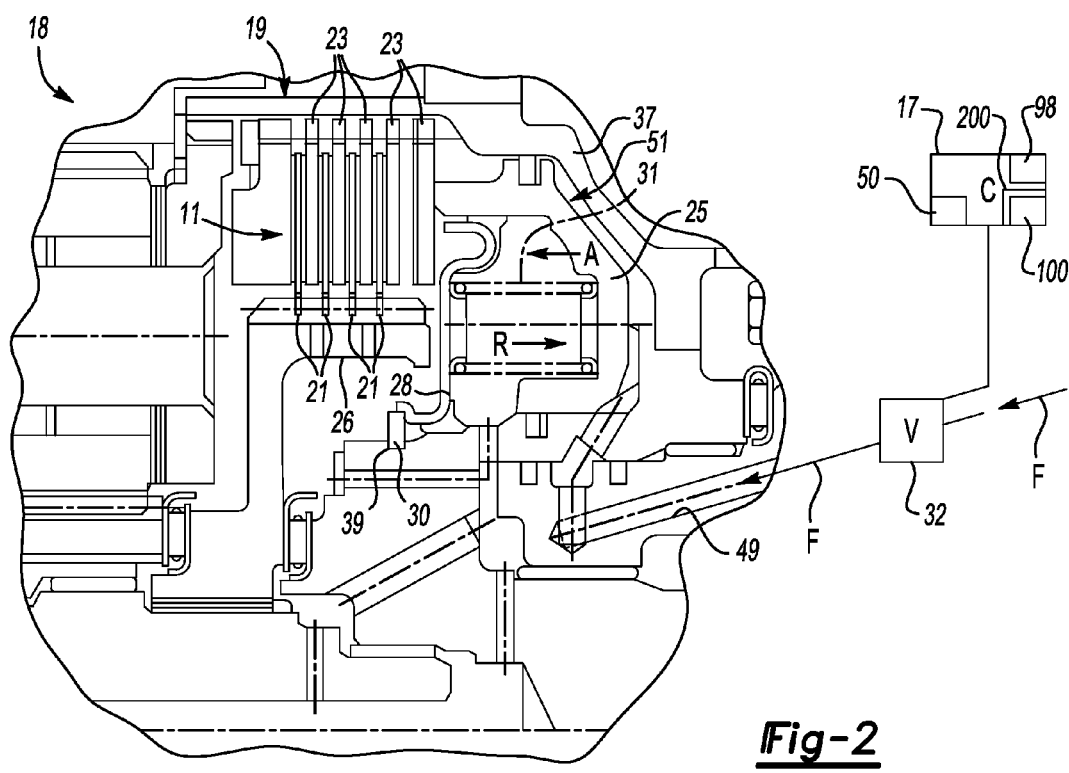
FIG. 2 is a schematic cross-sectional illustration of a representative clutch usable with the vehicle of FIG. 1.

The operation of the clutch 18 can be controlled using an electronic control unit or a controller (C) 17, which can be configured to include or communicate with a larger transmission control algorithm 200 as shown in FIG. 2. The controller 17 is programmed with or otherwise has access to a clutch fill control algorithm or modeling method 100 and a training database 98 as shown in FIG. 2, and as will be described below with reference to FIG. 5.

The vehicle 10 is shown in an exemplary embodiment as a conventional vehicle, i.e., having an internal combustion engine and a geared or a continuously variable transmission 14, each of the type known in the art. However, other vehicle configurations such as hybrid electric vehicles (HEV) or purely electric vehicles (PEV) may also be used within the scope of the invention, which may or may not include the engine 12. That is, within the scope of the invention the engine 12 can be replaced by other suitable energy sources such as fuel cells, a fuel stack, batteries, and/or other electrical or electro-chemical energy devices.

Referring to FIG. 2, the clutch 18 of FIG. 1 includes a clutch pack 11 that is disposed or positioned within an outer casing or housing 37. In the representative clutch 18, the housing 37 has teeth or splines 19 which are configured to receive the clutch pack 11, as will be understood by those of ordinary skill in the art. The clutch pack 11 has a plurality of interspaced clutch plates 23 and friction plates 21.

The friction plates 21 are connected to a clutch hub 26 or to another selectively rotatable member of the transmission 14 of FIG. 1. The clutch plates 23 and the friction plates 21 may be selectively engaged by a hydraulically-actuated clutch apply piston 25 or another suitable clutch-apply device. The clutch 18 includes a return spring 31 which is disposed between the apply piston 25 and a return piston or balance piston 28, with the return spring 31 applying a sufficient amount of return force to the apply piston 25 in the direction of arrow R when the clutch 18 is being disengaged. A retaining ring 30 can be adapted for retaining the balance piston 28, and is disposed within a retainer groove 39. A fluid passage 49 delivers pressured fluid (arrow F) from a valve (V) 32 to an apply chamber 51 with the clutch 18, with the fluid (arrow F) providing the necessary fluid force needed for compressing the plates 21, 23 in the direction of arrow A, and to thereby apply or engage the clutch 18.

The method 100 optimizes a clutch fill event by determining, modeling, or estimating a clutch fill time, as described below with reference to FIGS. 4 and 5. The method 100 can be a dedicated or stand-alone method, or it can be executed as a portion of the overall transmission control algorithm 200 as shown in FIG. 2. As will be understood by those of ordinary skill in the art, a typical transmission control algorithm 200 is any control algorithm or method having the overall authority in determining the various shift states/phases, command line pressure, and/or stroke profiles of the clutch 18. The steps of the method 100 as shown in FIG. 5 are for the control of the filling phase or fill event of the clutch 18 in anticipation of a shift event.

Still referring to FIG. 2, the controller 17 is in direct or indirect communication with the valve (V) 32. A sensor (not shown) is operable for measuring a temperature of the fluid (arrow F), such as in a sump portion (not shown) of the transmission 14 of FIG. 1, or in other accessible portion thereof, and for relaying the temperature measurement to the controller 17 for use by the method 100, as described below with reference to FIGS. 4 and 5.

The valve 32 is any fluid control device that selectively admits and prevents delivery of a flow of pressurized fluid (arrows F) to the apply chamber 51 as needed, and as determined by the controller 17. The valve 32 may be, for example, a solenoid-operated fluid control valve, but within the scope of the invention may include any other suitable fluid control device or valve generally characterized as being either of the on/off or modulated type, as well as a single or 2-stage device, i.e., a variable bleed solenoid with a regulator valve.

Each shift from one speed ratio to another includes an active "fill" phase or event during which an on-coming clutch is filled with pressurized fluid in preparation for torque transmission. The pressurized fluid compresses an internal return spring, such as the return spring 31 shown in FIG. 1, thereby "stroking" a clutch apply piston, such as the piston 25 and/or a wave plate (not shown) of the type known in the art. Once sufficiently filled, the piston 25 applies a force to the plates 23, 21 in the direction of arrow A, thus developing a torque capacity exceeding the return force (arrow R) of the return spring 31. Thereafter, the clutch 18 may transmit torque in relation to a clutch apply pressure, and the entire shift event may be completed using various control strategies and methodologies. The volume of fluid required to sufficiently fill a clutch through the clutch fill event, and to stroke the return spring 31 and thereby cause the clutch 18 to sufficient gain torque capacity, is typically referred to as the "clutch volume".

In accordance with the invention, in order to properly control the clutch fill event, the controller 17 predicts, models, or otherwise estimates a required amount of time, referred to hereinafter for simplicity as the estimated fill time (EFT), for filling the apply chamber 51 during the current fill event. The controller 17 then controls the valve 32 and any other required mechanisms of the clutch 18, to ensure that the apply chamber 51 is filled within the EFT. To accurately estimate the EFT, the controller 17 utilizes a neural network 50 (also see FIG. 4) within the method 100.

As will be understood by those of ordinary skill in the art, a "neural network" is an information processing paradigm capable of looking at a total or composite set of detectable or measurable process variables or parameters, typically referred to as a "signature", and of estimating or modeling a result or outcome based on this signature. A neural network can be configured to recognize composite patterns and predict a result when exposed to a new pattern, or it can be configured to process a plurality of input variables in a particular manner as described below in order to estimate or model the outcome. Also as will be understood by those of ordinary skill in the art, a neural network can improve its accuracy over time by exposing the neural network to additional and varied signatures or input sets, and correlating the estimated or modeled outcome with actual observed or measured results.

Figure 4:
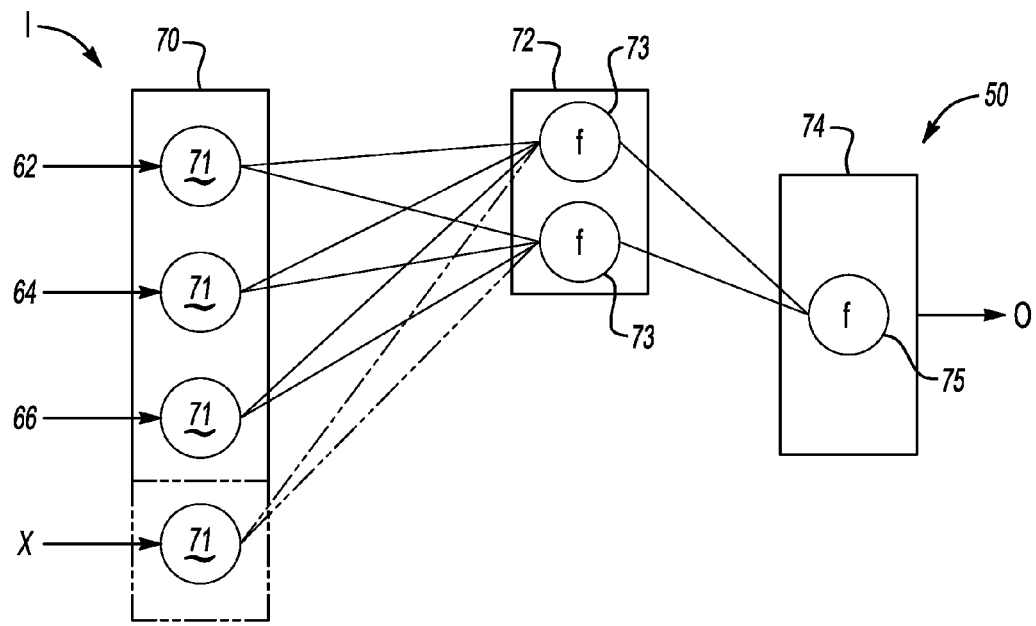
FIG. 4 is a schematic illustration of an artificial neuron model or a neural network which is usable with the controller of the vehicle shown in FIG. 1.
Figure 5:
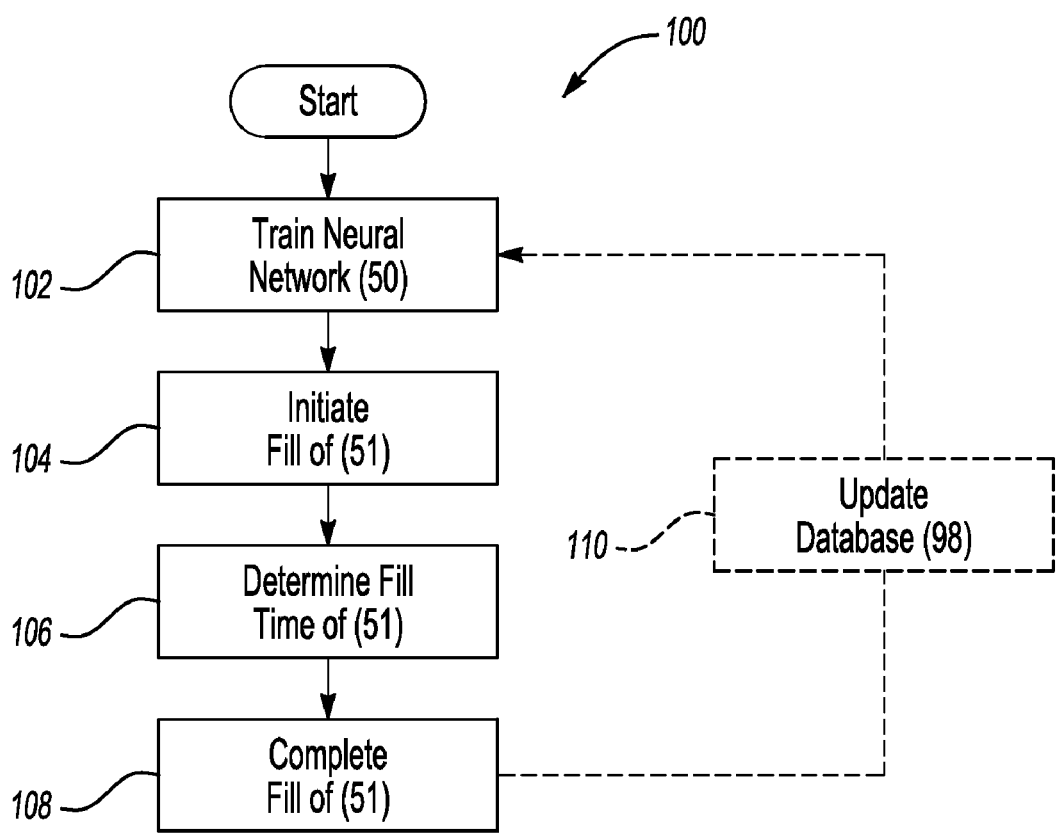
FIG. 5 is a schematic flow chart describing a method for estimating and controlling a fill time of the clutch of FIG. 2.

In particular, the neural network 50 of FIGS. 2 and 4 is configured to process a plurality of input variables or values corresponding to or describing a clutch fill event, i.e., values which are measured, detected, calculated, selected, or otherwise determined in the course of filling the apply chamber 51 with the fluid (arrow F). In one embodiment, the neural network 50 is a back-propagation-type network, and therefore is trained via a controlled training process, for example by subjecting the neural network 50 to a supervised learning process.

Neural networks such as the neural network 50 may be used to estimate or model a particular result using less than optimal, imprecise, and/or a relatively complex and dynamically changing set of input data. For example, a set of input data may consist of certain clutch fill process variables, such as but not limited to a calibrated command line pressure, a calibrated command fill stroke pressure, a viscosity of the fluid (arrow F), and/or any other such input variables. With respect to the viscosity, this value can be determined in a number of ways. In one embodiment, a formula can be used to calculate an approximate viscosity. An exemplary formula is $\mu = [e^{(-\beta * T)}]$, wherein the constant ($\beta$) is a calibrated parameter determined by experiment, and is based on the particular type of fluid being used, and which also may be determined as a function of expected fluid life. Other formulas, including non-exponential formulas, may also be used within the scope of the invention. Alternately, calibrated values for the fluid may be stored in a lookup table within the controller 17 (see FIG. 1), with the estimated viscosity being pulled or selected from the lookup table as needed based on, for example, a measured temperature of the fluid.

The neural network 50 of FIGS. 2 and 4 utilizes associative memory to process the combined input set to which the neural network 50 is subjected, such as the clutch fill system input set "I" shown in FIG. 4 described below. In this manner, a properly trained neural network will be able to accurately and consistently determine or model a future result or value from its collective past experience, embodied as the training database 98 of FIG. 2, and generate an output value as represented by the arrow O in FIG. 4, and/or recognize an overall pattern presented by the totality of the complex data set, which might otherwise require substantial time and/or expertise to properly decipher.

Figure 3:
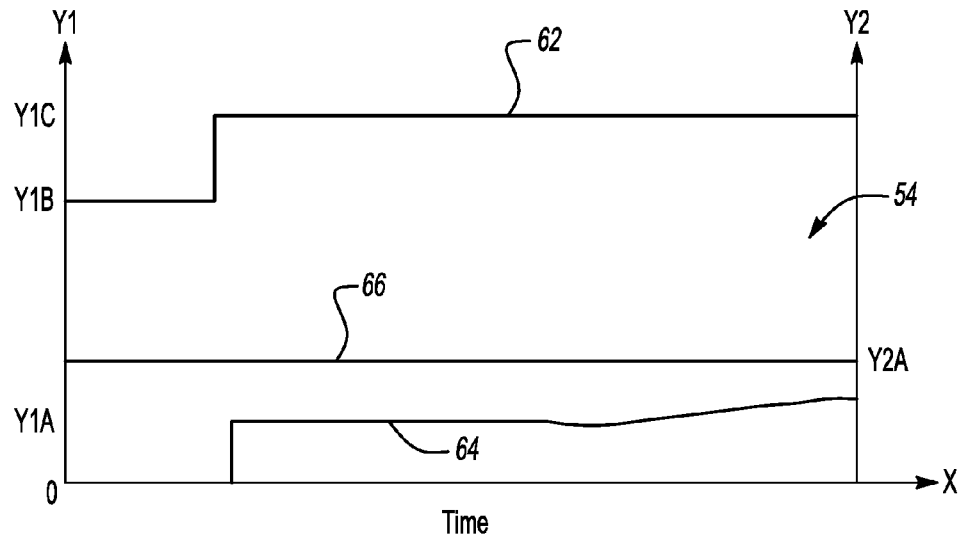
FIG. 3 is a graphical illustration of a representative fill signature of the fluid clutch of FIG. 2.

Referring to FIG. 3, a representative input data set as described above may be embodied collectively herein as the clutch fill signature (CFS) 54. The CFS 54 itself represents the normalized values over time of a plurality or set of input variables, as represented by the traces 62, 64, and 66. The magnitudes of the traces 62, 64, and 66 each correspond to a different input variable. For example, in one embodiment the trace 62 represents a normalized calibrated command line pressure which can be determined via a lookup table (not shown) or pulled from memory. Its corresponding magnitude is Y1B or Y1C, depending on the point in time at which the value is determined. The trace 64 represents a normalized calibrated command fill stroke pressure, again determined via a lookup table (not shown) or pulled from memory. Its corresponding magnitude is Y1A. The trace 66 represents the estimated normalized viscosity of the fluid (arrow F) of FIG. 2, which can be calculated as a function of a fluid temperature measured within a sump (not shown) of the transmission 14 of FIG. 1, or by any other available means. Its normalized magnitude is Y2A. Within the scope of the invention, the normalized magnitudes Y1A-Y1C and Y2A are used as inputs, and therefore FIG. 3 is not intended to represent specific magnitudes.

Referring to FIG. 4, the neural network 50 described generally above is programmed, stored in, or otherwise accessible by the controller 17 (see FIGS. 1 and 2), and is usable by the controller 17 to accurately predict, classify, or otherwise recognize a pattern in the representative CFS 54 of FIG. 3. The neural network 50 includes an input layer 70 having a plurality of different input neurons or input nodes 71, each of which are configured to receive data, measurements, and/or other predetermined information from outside of the neural network 50.

As shown in the representative embodiment of FIG. 4, this information or input set (I) can include, but is not necessarily limited to, the normalized magnitudes of the traces 62, 64, 66 of FIG. 3 as described above, such as the magnitudes of a command line pressure, a command fill stroke pressure, and an estimated viscosity of the fluid, with the fluid represented by the arrows F of FIG. 2. At least one optional input node 71, shown in phantom, may be configured to receive an additional piece of input data, such as a magnitude of another measurement or other process information describing some aspect of the clutch fill event as needed, with this optional input variable being represented in FIG. 4 by the variable X.

Within the scope of the invention, the neural network 50 can also include at least one "hidden" layer 72, although the neural network 50 can also be used without any hidden layers whatsoever within the scope of the invention, depending on the particular configuration thereof. When used, each hidden layer 72 contains hidden neurons or hidden nodes 73 that receive and pass along information that is output or relayed from the input nodes 71 of the input layer 70, with the hidden nodes 73 passing along the processed information to other neurons or nodes of one or more additional hidden layers (not shown) if used, or directly to an output layer 74. In the embodiment shown in FIG. 4, there are two hidden nodes 73 to provide for a relatively rapid training cycle or process, although fewer or more hidden nodes 73 may be used within the scope of the invention to provide the desired amount of tradeoff between training efficiency and accuracy improvement of the neural network 50. The output layer 74 likewise contains at least one output neuron or output node 75 that communicates or transmits information outside of the neural network 50, such as to a different portion of the controller 17, for example to command a pressure profile of the clutch 18 of FIG. 2, controlling the valve 32 of FIG. 1 as needed, etc.

In the representative embodiment of FIG. 4, each of the neurons or nodes 73, 75 of the hidden layer 72 and the output layer 74, respectively, may employ a linear or non-linear transfer function, including but not limited to a sigmoidal transfer or activation function as shown, but may alternately employ other types or combinations of transfer or activation functions as desired, and/or different numbers of hidden layers 72 and/or nodes 73, 74, in order to achieve the desired level of modeling accuracy depending on the particular output (arrow O) required. In one embodiment, the neural network 50 is initially trained using the Levenberg-Marquardt back-propagation algorithm, but training is not so limited, with any other suitable training method or algorithm being usable with the invention.

Referring to FIG. 5 in conjunction with the various Figures, one possible embodiment of the method 100 of FIGS. 1 and 2 is shown in flow chart form, and may be programmed, stored, recorded, or is otherwise executable by the controller 17. The method 100 begins with step 102. Step 102 includes a preliminary training process as described above, and as that term will be understood by those of ordinary skill in the art, wherein the neural network 50 of FIG. 4 is trained to accurately determine or model a fill time from the constituent values of the CFS 54 (see FIG. 3).

As explained above, the CFS 54 is any composite signature describing a clutch fill event, and includes as its constituent values the traces 62, 64, 66 of FIG. 3 as described above. Step 102 may be conducted by exposing or subjecting the neural network 50 of FIG. 4 to a number of sufficiently different or varied clutch fill signatures and corresponding output values or estimated fill times. Generally, the greater the number of training signatures and corresponding fill times that are presented to a neural network, and the greater the variety of these data sets from one another, the more robust the network becomes, i.e., allowing the network to cover a broader operating range with reasonably good accuracy. Training can also include adjusting a correction factor to be applied to an output (O) of the neural network 50 (see FIG. 4) based on a particular variance or difference in the CFS 64 from the signatures in the database 98 (see FIG. 2), which potentially can be implemented relatively quickly. After properly training the neural network 50 in this manner, the method 100 proceeds to step 104.

At step 104, the clutch fill event is initiated. While the apply chamber 51 of FIG. 2 is being filled, values for each of the variables comprising the input data set I of FIG. 4 are selected, calculated, measured, or otherwise determined. Input data set I in one embodiment includes the magnitudes of the variables discussed above, i.e., the magnitudes of the calibrated command line pressure, the calibrated command fill stroke pressure, and the estimated viscosity of the fluid (arrow F of FIG. 2), although other variables and/or values can be used with or instead of this particular set of values. Once these values are properly determined at step 104, the method 100 proceeds to step 106.

At step 106, an estimated fill time (EFT) is generated or determined by the neural network 50 of FIG. 4. In particular, the input data set I (see FIG. 4) from step 104 is fed or directed into the input layer 70 of the neural network 50 of FIG. 4. The neural network 50 then processes the input data set I through the input layer 70 and the output layer 74, as well as any hidden layers 72 if used. The output (arrow O of FIG. 3) from the output layer 74 of the neural network 50 (see FIG. 4) is the EFT. The controller 17 of FIGS. 1 and 2 can then control the fill event as needed to ensure the apply chamber 51 of FIG. 2 is filled according to the EFT. That is, if the EFT is 0.5 seconds, the apply chamber 51 is filled in an amount of time that is as close to the EFT as possible, such as within an allowable range of the EFT. In one embodiment, the allowable range is ±5% of the EFT, although other ranges could be used within the scope of the invention. The method 100 then proceeds to step 108.

At step 108, the fill of the apply chamber 51 of FIG. 2 is completed using to the estimated fill time (EFT) as determined by the neural network 50 of FIG. 4 at step 106, or using the EFT of step 106 as modified or refined at step 110. The method 100 is then finished, or the method 100 can optionally proceed to step 110.

At step 110, the method 100 compares the EFT of step 106 to an observed fill time, such as a fill time that is observed or verified using physical and/or virtual sensors. For example, various measurements or calculations occurring during the clutch fill event and/or any subsequent engagement or application of the clutch 18 of FIG. 2 can be used to determine whether a particular shift event was executed in a sufficient or optimal manner using the EFT which was estimated, modeled, or otherwise determined at step 106. The method 100 can then include modifying the neural network 50 of FIG. 4 when the EFT that is predicted by the neural network 50 does not agree with the observed fill time.

While the best modes for carrying out the invention have been described in detail, those familiar with the art to which this invention relates will recognize various alternative designs and embodiments for practicing the invention within the scope of the appended claims.

The invention claimed is:

1. A method of controlling a fill event of an apply chamber of a fluid-actuated clutch, the method comprising:
determining a plurality of input values describing the fill event, including a calibrated command line pressure, a calibrated command fill stroke pressure, and a viscosity of a fluid used for filling the apply chamber, wherein the plurality of input values collectively defines a clutch fill signature (CFS);
processing the plurality of input values using a neural network having an input layer, a hidden layer, and an output layer each with one or more nodes to thereby recognize a pattern of the CFS;
estimating a fill time required for filling the apply chamber with the fluid using the pattern that is recognized by the neural network; and
filling the apply chamber with the fluid using the estimated fill time (EFT) to thereby optimize the fill event.

2. The method of claim 1, wherein filling the apply chamber with the fluid using the EFT includes filling the apply chamber within a predetermined range of the EFT.

3. The method of claim 2, wherein the predetermined range is approximately 95 to 105 percent of the EFT.

4. The method of claim 1, wherein determining a plurality of input values includes estimating the viscosity of the fluid using a temperature of the fluid.

5. The method of claim 4, wherein estimating the viscosity of the fluid using a temperature of the fluid is selected from the group consisting of: calculating the viscosity using the temperature of the fluid and selecting the viscosity from a lookup table which is indexed by the temperature of the fluid.

6. The method of claim 1, wherein the input layer of the neural network includes a plurality of input neurons, and wherein processing the plurality of input values using a neural network includes: processing each of the plurality of input values through a corresponding one of the plurality of input neurons.

7. The method of claim 6, wherein the hidden layer of the neural network includes a plurality of hidden neurons that is less than the plurality of input neurons, the method further comprising:
processing an output value from the input layer through each of the plurality of hidden neurons.

8. A method of controlling a fill event of a fluid-actuated clutch, the method comprising:
determining a calibrated command line pressure and a calibrated command fill stroke pressure within the fluid-actuated clutch;
estimating a viscosity of a fluid used for actuating the fluid clutch;
processing the calibrated command line pressure, the command fill stroke pressure, and the estimated viscosity through a neural network, wherein the calibrated command line pressure, calibrated command fill stroke pressure, and viscosity collectively define a clutch fill signature (CFS);
determining an estimated fill time (EFT) required for filling an apply chamber of the fluid-actuated clutch by recognizing a pattern of the CFS via the neural network; and
controlling the filling of the apply chamber using the EFT.

9. The method of claim 8, further comprising:
determining if EFT corresponds to an observed fill time; and
modifying the neural network when the EFT that is predicted by the neural network does not agree with the observed fill time.

10. The method of claim 8, wherein estimating a viscosity of a fluid used for actuating the fluid clutch includes measuring a temperature of the fluid and then estimating the viscosity using the measured temperature.

11. A clutch fill system comprising:
a fluid-actuated clutch having a piston disposed within an apply chamber; and
a controller configured for determining a plurality of input values describing a fill event of the fluid-actuated clutch, wherein the plurality of input values collectively defines a clutch fill signature (CFS) and includes a calibrated command line pressure of the fluid-actuated clutch, a command fill stroke pressure of the fluid-actuated clutch, and an estimated viscosity of a fluid used to actuate the clutch;
wherein the controller includes a neural network having an input layer with a plurality of input nodes, a hidden layer having a plurality of hidden nodes that is less than the plurality of input nodes, and an output layer having a single output node, and wherein the controller is configured for using the neural network for estimating a fill time required for filling the apply chamber by recognizing a pattern of the CFS, and is operable for controlling a filling of the apply chamber within the estimated fill time.

12. The system of claim 11, wherein the hidden layer is a single hidden layer having two hidden nodes.

13. The system of claim 12, wherein the two hidden nodes each utilize a non-linear transfer function.

14. The method of claim 1, wherein each of the input layer, the hidden layer, and the output layer includes at least one neuron employing a sigmoidal transfer function.

* * * * *